(12) United States Patent
Jones

(10) Patent No.: US 10,604,695 B2
(45) Date of Patent: Mar. 31, 2020

(54) TERPOLYMER COMPOSITIONS

(71) Applicant: Evonik Corporation, Parsippany, NJ (US)

(72) Inventor: Cruise Kenneth Jones, Conroe, TX (US)

(73) Assignee: Evonik Corporation, Parsippany, NJ (US)

( * ) Notice: Subject to any disclaimer, the term of this patent is extended or adjusted under 35 U.S.C. 154(b) by 0 days.

(21) Appl. No.: 15/991,742

(22) Filed: May 29, 2018

(65) Prior Publication Data

US 2018/0362837 A1 Dec. 20, 2018

Related U.S. Application Data

(62) Division of application No. 15/132,524, filed on Apr. 19, 2016, now Pat. No. 9,982,184.

(60) Provisional application No. 62/150,116, filed on Apr. 20, 2015.

(51) Int. Cl.
| | |
|---|---|
| *C09K 8/68* | (2006.01) |
| *C08F 220/56* | (2006.01) |
| *C09K 8/88* | (2006.01) |
| *C09K 8/035* | (2006.01) |
| *C08F 220/34* | (2006.01) |
| *C09K 8/60* | (2006.01) |

(52) U.S. Cl.
CPC .............. *C09K 8/68* (2013.01); *C08F 220/34* (2013.01); *C08F 220/56* (2013.01); *C09K 8/035* (2013.01); *C09K 8/882* (2013.01); *C09K 8/885* (2013.01); *C09K 8/602* (2013.01); *C09K 2208/28* (2013.01)

(58) Field of Classification Search
None
See application file for complete search history.

(56) References Cited

U.S. PATENT DOCUMENTS

| | | |
|---|---|---|
| 3,284,393 A | 11/1966 | Vanderhoff et al. |
| 3,710,865 A | 1/1973 | Kiel |
| 4,460,758 A | 7/1984 | Peiffer et al. |
| 4,500,437 A | 2/1985 | Engelhardt et al. |
| 5,027,843 A | 7/1991 | Grabois et al. |
| 6,787,506 B2 | 9/2004 | Blair et al. |
| 7,846,878 B2 | 12/2010 | Robb et al. |
| 8,865,632 B1 | 10/2014 | Parnell et al. |
| 2003/0191030 A1 | 10/2003 | Blair et al. |
| 2009/0264322 A1 | 10/2009 | Morris et al. |
| 2009/0264324 A1* | 10/2009 | Kurian ................. C09K 8/512 507/224 |
| 2010/0331510 A1 | 12/2010 | Reichenbach-Klinke et al. |
| 2011/0201748 A1 | 8/2011 | Pawlowska et al. |
| 2012/0035085 A1 | 2/2012 | Parnell et al. |
| 2012/0245061 A1 | 9/2012 | Kakadjian et al. |
| 2014/0051620 A1 | 2/2014 | Soane et al. |
| 2017/0362487 A1* | 12/2017 | Waterman ................ C09K 8/26 |
| 2017/0362489 A1* | 12/2017 | Jackson ................ C09K 8/584 |

FOREIGN PATENT DOCUMENTS

JP S57 191398 A 11/1982

\* cited by examiner

*Primary Examiner* — John J Figueroa
(74) *Attorney, Agent, or Firm* — Linda S. Li; Jason S. Ngui

(57) ABSTRACT

Salt-tolerant friction-reducing terpolymer compositions are provided. The compositions can be used in a method of reducing friction resulting from turbulent flow in an aqueous fracturing fluid in a subterranean fracturing process.

5 Claims, 2 Drawing Sheets

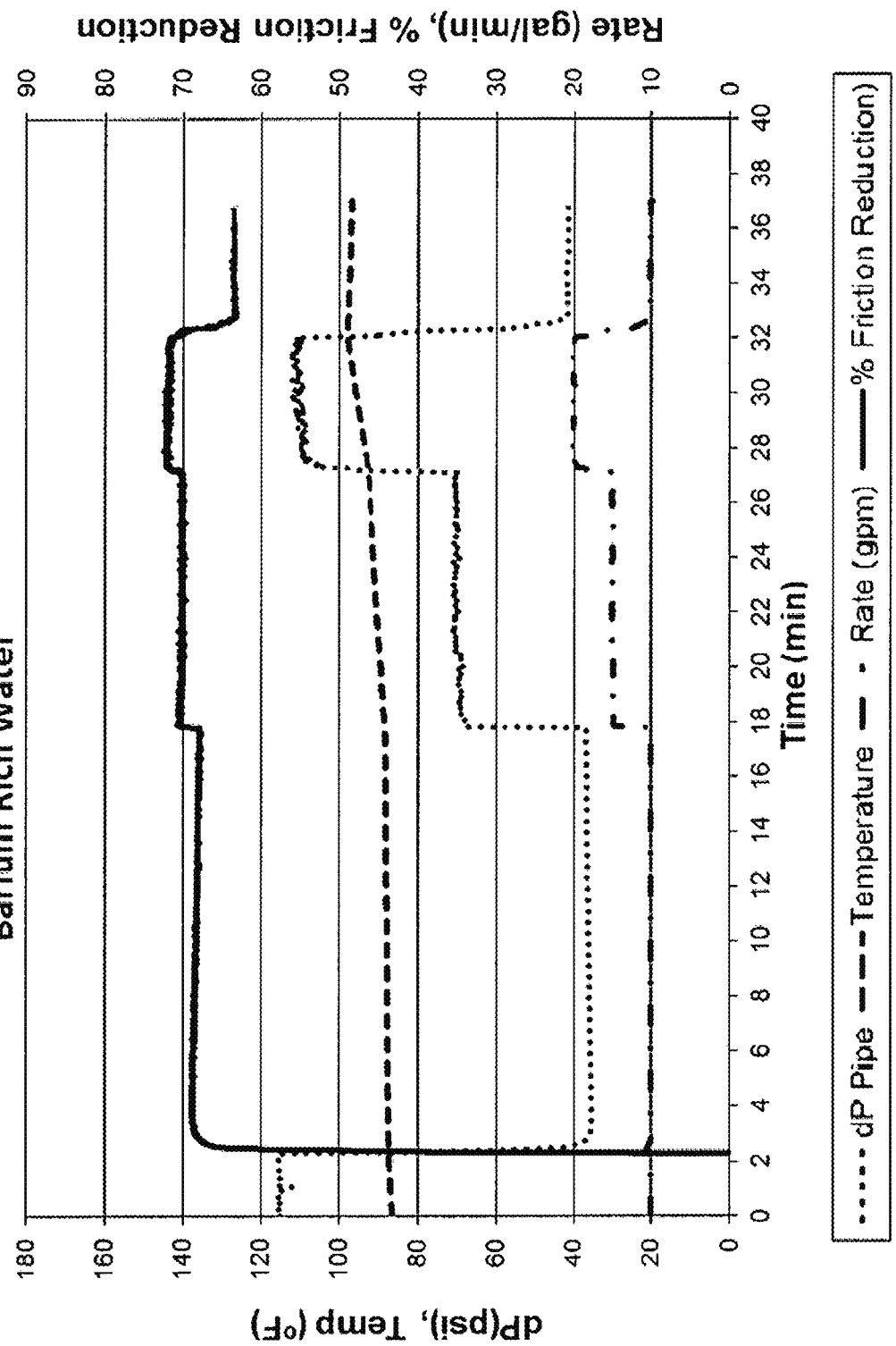

TERPOLYMER COMPOSITIONS

This application is a continuation of and claims priority to U.S. application Ser. No. 15/132,524, filed on Apr. 19, 2016, which claims the benefit of U.S. Provisional Application Ser. No. 62/150,116, filed on Apr. 20, 2015, applications which are incorporated by reference herein in their entirety.

TECHNICAL FIELD

The present disclosure relates generally to friction-reducing compositions and more specifically to friction-reducing terpolymer compositions, methods of making the compositions and methods of using the compositions in aqueous liquids such as aqueous liquids pumped into subterranean oil and gas well formations.

BACKGROUND

After oil and gas wells are drilled, cased, and cemented it is often necessary to stimulate the reservoir in order for production fluids to flow economically from the well. The fracturing process involves pumping aqueous fluids into the well at a rate sufficient to fracture the rock.

From pumping aqueous liquids at rates sufficient to fracture rock, turbulence develops, creating friction pressure, or drag, resulting in substantial pump energy loss which could otherwise be directed towards fracturing rock. It is thus typical in the fracturing industry to inject materials in small amounts which suppress drag (and thus friction pressure). This is most commonly accomplished in the oilfield via water soluble acrylic polymers and copolymers, added in small amounts to aqueous fracturing fluids. The polymers can be delivered during a fracturing treatment via several means, though most are delivered via oil-external emulsion or from dissolving analogous dry polymers.

The surfactants in these friction reducer emulsions are added to stabilize the polymer as a suspension and often possesses low HLB values (generally between 4 and 8). Upon contact with water, the emulsion "inverts", resulting in polymer transfer to the water. The inversion is typically facilitated through the use of a subsequent water-soluble "inverting surfactant" of HLB greater than 7. The inverting surfactant may be part of the inverting polymer emulsion, or added to the aqueous solution in which the emulsion is to be inverted.

One problem with known oil-continuous emulsion treatments is that the inverting surfactants may adversely interact with the emulsion and destabilize it. Thus usually inverting surfactants are added to emulsions at less than 5%. Polymer emulsions with this low amount of inverting surfactant may not provide the desired friction reduction because the polymer emulsion either does not invert completely or is not tolerant of concentrated brine nor acidic water found in natural oil well reservoir for example.

SUMMARY

In one aspect, disclosed is a friction reducing terpolymer, comprising a cationic monomer, a nonionic monomer, and a monomer having a pendant alcohol moiety.

In another aspect, disclosed is a method of synthesizing a terpolymer as an oil-continuous emulsion, the method comprising: combining an aliphatic oil and a surfactant to provide a first mixture; adding a cationic monomer, a nonionic monomer, a monomer having a pendant alcohol moiety, and a salt to the combined aliphatic oil and surfactant to provide a second mixture; adding a free radical initiator in an aliphatic hydrocarbon slurry to the second mixture to provide a reactant mixture; and heating the reactant mixture to provide a terpolymer as an oil-continuous emulsion.

In still another aspect, disclosed is a method of reducing friction resulting from turbulent flow in an aqueous fracturing fluid in a subterranean fracturing process, the method comprising adding to the aqueous fracturing fluid an effective friction-reducing amount of a terpolymer.

In still another aspect, disclosed is a method of reducing friction resulting from turbulent flow in an aqueous fracturing fluid in a subterranean fracturing process, the method comprising adding a friction-reducing composition to the aqueous fracturing fluid; wherein the friction-reducing composition comprises, by weight, about 30% to about 40% water, about 30% to about 40% a terpolymer, about 20% to about 30% an aliphatic oil, and about 2% to about 5% a surfactant.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIG. 2 depicts friction reduction performance of an exemplary embodiment.

DETAILED DESCRIPTION

Figure 1:
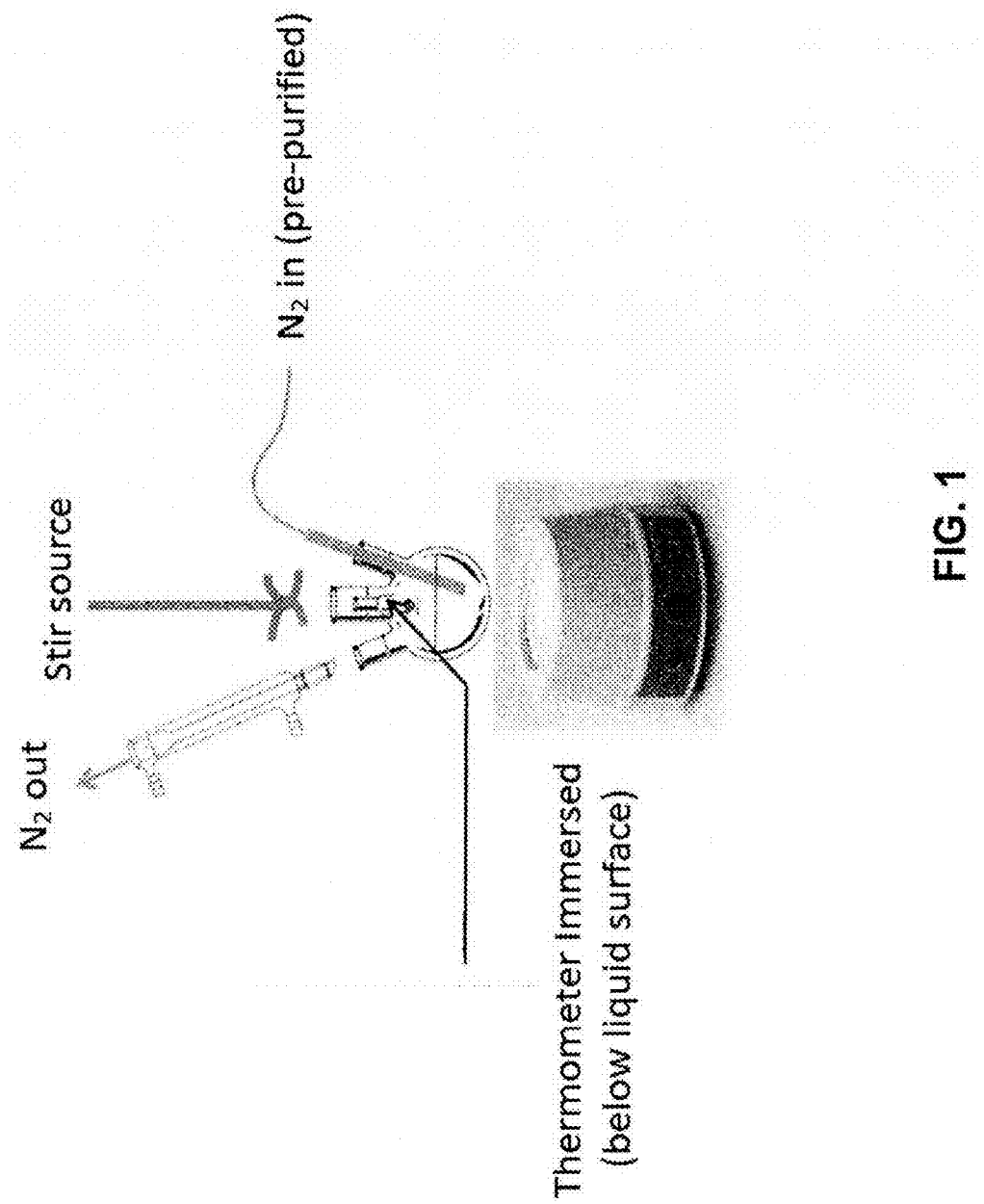
FIG. 1 depicts an exemplary laboratory setup for preparing the disclosed compositions.

Disclosed herein are salt-tolerant friction-reducing compositions. The compositions can be used to reduce friction resulting from turbulent flow in an aqueous fluid (e.g., an aqueous fracturing fluid in an oil field fracturing process). Also disclosed are methods of using the salt-tolerant friction-reducing compositions to reduce friction in an aqueous fluid, the methods including adding to an aqueous fluid an effective amount of salt-tolerant friction-reducing composition.

The disclosed compositions provide several advantages over known friction-reducing compositions. As one advantage, the disclosed compositions can be used for friction-reduction in an aqueous fluid having high salt content (e.g., total dissolved solids of 200,000 mg/L or greater), without employing a complexing agent, such as ethylene diamine tetra-acetic acid tetrasodium salt and other small-molecule carboxylates, or phosphates. As another advantage, the disclosed compositions can be used for friction-reduction in an aqueous fluid without including a surfactant in the compositions, or optionally, with a single surfactant, preferably having a hydrophilic-lipophilic balance (HLB) of less than 7. Another advantage is incorporation of novel stabilizing surfactants based on Elevance® 1000 (methyl-9-decenoate) and Elevance® 1200 (methyl-9-dodecenoate) metathesis-derived ester alkenes. The Elevance additives help with shelf life stability, and for improving inversion in field applications.

1. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The term "gpm" means gallons per minute.
The term "gpt" means gallons per thousand gallons.
The term "gptg" means gallons per thousand gallons.
The term "pptg" means pounds per thousand gallons.
The term "wt. %" means weight percent.
The term "w/w" means weight per weight.
The term "amphoteric" refers to surfactants that have both positive and negative charges. The net charge of the surfactant can be positive, negative, or neutral, depending on the pH of the solution.

The term "anionic" means a compound that possesses a net negative charge.

The term "cationic" means a compound that possesses a net positive charge.

The term "monomer" may refer to a polymerizable allylic, vinylic, or acrylic compound. The monomer may be anionic, cationic, or nonionic.

Exemplary anionic monomers include, but are not limited to, (meth)acrylic acid, and it's salts, including, but not limited to acrylic acid, sodium acrylate, ammonium acrylate, methacrylic acid, sodium methacrylate, and ammonium methacrylate; 2-acrylamido-2-methylpropanesulfonic acid (AMPS) and its sodium salt; vinyl sulfonic acid and its salts including sodium vinyl sulfonate; styrene sulfonic acid and its salts; maleic acid and it's salts, including, but not limited to the sodium salt and ammonium salt; sulfopropyl acrylate or methacrylate or other water-soluble forms of these or other polymerisable carboxylic or sulphonic acids; sulfomethylated acrylamide; allyl sulfonate; itaconic acid, acrylamidomethylbutanoic acid; fumaric acid; vinylphosphonic acid; allylphosphonic acid, phosphonomethylated acrylamide, and the like.

Exemplary cationic monomers include, but are not limited to, dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride.

Exemplary nonionic monomers include, but are not limited to, acrylamide, methacrylamide, N-methylacrylamide, N,N-dimethylacrylamide, N,N-diethylacrylamide, N-isopropylacrylamide, N-vinylformamide, N-vinylmethylacetamide, dim ethylhydroxypropyl (meth)acrylate, hydroxyethyl methacrylate, hydroxyethyl acrylate, hydroxypropyl acrylate, hydroxypropyl methacrylate, N-t-butylacrylamide, N-methylolacrylamide, vinyl acetate, acrylonitrile, 2-ethylhexyl acrylate, and the like.

The term "fracturing" refers to the process and methods of breaking down a geological formation (e.g., the rock formation around a well bore, by pumping fluid at very high pressures, in order to increase production rates from a hydrocarbon reservoir).

The term "proppant" refers to a granular substance suspended in the fracturing fluid during the fracturing operation, which serves to keep the formation from closing back down upon itself once the pressure is released. Exemplary proppants include, but are not limited to, 20-40 mesh sand, resin-coated sand, sintered bauxite, glass beads, and similar materials.

The term "surfactant" refers to a soluble, or partially soluble compound that reduces the surface tension of liquids, or reduces interfacial tension between two liquids, or a liquid and a solid by congregating and orienting itself at these interfaces.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Friction Reducing Compositions

Disclosed are salt-tolerant friction reducing compositions. The compositions include at least one terpolymer, at least one aliphatic oil, at least one surfactant, and water. The compositions may include a salt. The compositions may include a free radical initiator. The compositions may include a chelant. The compositions may be essentially free of a chelant. The compositions may comprise no chelant. The compositions may include one or more additional components.

a. Terpolymer

The disclosed compositions include at least one terpolymer component. The terpolymer may be a dispersion polymer or an emulsion polymer. The terpolymer may be a cationic polymer. The terpolymer may be a synthetic polymer comprising a variety of monomeric units. In certain embodiments, the terpolymer comprises one or more nonionic monomers, one or more cationic monomers, and one or more monomers having a pendant alcohol moiety. In certain embodiments, the terpolymer does not include an anionic monomer content.

The terpolymer content of the disclosed compositions may range from about 20% to about 50%, about 30% to about 50%, about 20% to about 40%, about 30% to about 40%, about 30% to about 38%, about 32% to about 38%, about 34% to about 38%, about 34% to about 36%, about 35% to about 38%, or about 35% to about 36%, based on total weight of the composition. The terpolymer content of the disclosed compositions may be about 20%, about 25%, about 30%, about 31%, about 32%, about 33%, about 34%, about 35%, about 35.5%, about 36%, about 37%, about 38%, about 39%, about 40%, about 45%, or about 50%, based on total weight of the composition. In certain embodiments, the terpolymer content of the disclosed compositions is about 35.5%, based on total weight of the composition.

Nonionic Monomer

The terpolymer includes at least one nonionic monomer. The nonionic monomer may be acrylamide, methacrylamide, N-methylacrylamide, N,N-dimethyl(meth)acrylamide, octyl acrylamide, N(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate, 2-hydroxyethyl(meth)acrylate, vinyl methylsulfone, or vinyl acetate.

The nonionic monomer content of the terpolymer may be about 30% to about 50%, about 35% to about 50%, about 35% to about 45%, about 37% to about 45%, about 37% to about 43%, about 39% to about 43%, or about 40% to about 42%, based on total weight of the terpolymer. The nonionic monomer content of the terpolymer may be about 30%, about 35%, about 36%, about 37%, about 38%, about 39%, about 40%, about 41%, about 42%, about 43%, about 44%, about 45%, or about 50%, based on total weight of the terpolymer. In certain embodiments, the cationic monomer content of the terpolymer is about 41%, based on total weight of the terpolymer.

ii. Cationic Monomer

The terpolymer includes at least one cationic monomer. The cationic monomer possesses a positive charge. Representative cationic monomers include dialkylaminoalkyl acrylates and methacrylates and their quaternary or acid salts. The cationic monomer may be dimethylaminoethylacrylate methyl chloride quarternary salt, diallyldimethylammonium chloride (DADMAC), (3-acrylamidopropyl)trimethylammonium chloride (MAPTAC), (3-methacrylamido)propyltrimethylammonium chloride, dimethylaminoethylmethacrylate methyl chloride quarternary salt, dimethylaminoethylacrylate benzylchloride quarternary salt, or N,N-dimethylaminoethyl methacrylate methyl chloride quaternary salt, The cationic monomer content of the terpolymer may be about 40% to about 70%, about 45% to about 70%, about 50% to about 70%, about 50% to about 65%, about 55% to about 65%, about 55% to about 60%, about 56% to about 60%, or about 57% to about 59%, based on total weight of the terpolymer. The cationic monomer content of the terpolymer may be about 40%, about 45%, about 50%, about 55%, about 56%, about 57%, about 58%, about 59%, about 60%, about 61%, about 62%, about 65%, or about 70%, based on total weight of the terpolymer. In certain embodiments, the cationic monomer content of the terpolymer is about 58%, based on total weight of the terpolymer.

iii. Monomer Having a Pendant Alcohol

The terpolymer includes at least one monomer having a pendant alcohol. The monomer having a pendant alcohol may provide surface active stability to the terpolymer and provide stability in water, thus providing surfactancy to the polymer for friction reduction. The monomer having a pendant alcohol may stabilize ions that may be present in an aqueous fluid to be treated. In turn, use of a monomer having a pendant alcohol may allow for use of less surfactant in the composition. The monomer having a pendant alcohol may be N(2-hydroxypropyl) methacrylamide or 2-hydroxyethylmethacrylate. The 2-hydroxyethylmethacrylate monomer may also contain a small amount of hydroxyethyl dimethacrylate or be completely free of the latter monomer.

The monomer having a pendant alcohol content of the terpolymer may be about 0.1% to about 10%, about 0.1% to about 5%, about 0.5% to about 5%, about 0.5% to about 4%, about 0.5% to about 3%, about 0.5% to about 2.5%, about 1.0% to about 2.5%, or about 1.0% to about 2.0%, based on total weight of the terpolymer. The monomer having a pendant alcohol content of the terpolymer may be about 0.1%, about 0.5%, about 1.0%, about 1.1%, about 1.2%, about 1.3%, about 1.4%, about 1.5%, about 1.6%, about 1.7%, about 1.8%, about 1.9%, about 2.0%, about 2.5%, about 5%, or about 10%, based on total weight of the terpolymer. In certain embodiments, the monomer having a pendant alcohol content of the terpolymer is about 1.4%, based on total weight of the terpolymer.

b. Aliphatic Oil

The disclosed compositions may include at least one aliphatic oil. Use of an aliphatic oil promotes formation of an emulsion, allowing production of a more active product (more polymer per a given volume of product) compared to dissolution of the polymer in aqueous solution. The aliphatic oil may be a low viscosity fluid with a kinematic viscosity of about 1.0, about 1.1, about 1.2, about 1.3, about 1.4, abut 1.5, about 1.6, about 1.7, about 1.8, about 1.9, about 2.0, about 2.1, about 2.2, about 2.3, about 2.4, or about 2.5 centistokes at 40° C. Suitable aliphatic oils include, but not limited to those sold under the Escaid™ hydrocarbon fluids trademark by ExxonMobil. For example, the aliphatic oil may be Escaid® Pathfrac and/or a mixture of Pathfrac® HV (high viscosity) grade.

The aliphatic oil content of the disclosed compositions may range from about 10% to about 40%, about 15% to about 40%, about 20% to about 40%, about 20% to about 35%, about 20% to about 30%, about 22% to about 28%, about 24% to about 28%, about 25% to about 27%, or about 25% to about 26%, based on total weight of the composition. The terpolymer content of the disclosed compositions may be about 10%, about 15%, about 20%, about 21%, about 22%, about 23%, about 24%, about 25%, about 25.6%, about 26%, about 27%, about 28%, about 29%, about 30%, about 35%, or about 40%, based on total weight of the composition. In certain embodiments, the aliphatic oil content of the disclosed compositions is about 25.6%, based on total weight of the composition.

c. Surfactant

The disclosed compositions may include at least one surfactant. The surfactant promotes compatibilization of the aliphatic oil and water to form a stable mixture (emulsion). The surfactant may have a hydrophilic-lipophilic balance (HLB) of less than 7. The surfactant may have a HLB of about 1 to about 6, about 1 to about 5, about 2 to about 5, about 2 to about 4, about 3 to about 4. The surfactant may have a HLB of about 1, about 2, about 3, about 3.7, about 4, about 5, or about 6. Suitable surfactants include, but are not limited to, ethoxylated alcohols, ethoxylated castor oils, ethoxylated sorbitan monooleates, and sorbitan sesquioleate and surfactant mixtures of the above with metathesis-derived alkylate ester surfactants.

The surfactant content of the disclosed compositions may range from about 1% to about 10%, about 1% to about 5%, about 2% to about 5%, about 3% to about 5%, or about 3% to about 4%, based on total weight of the composition. Within these amounts the methathesis-derived alkylate esters can comprise from up to 50% of the total surfactant package and cover the range of C-10 to C-12 alkyl chain lengths of the alkylate ester. The surfactant content of the disclosed compositions may be about 1%, about 2%, about 3%, about 3.5%, about 4%, about 5%, about 6%, about 7%, about 8%, about 9%, or about 10%, based on total weight of the composition. In certain embodiments, the surfactant content of the disclosed compositions is about 3.5%, based on total weight of the composition.

d. Water

The disclosed compositions include water. The water content of the disclosed compositions may range from about 20% to about 50%, about 30% to about 50%, about 20% to about 40%, about 30% to about 40%, about 30% to about 35%, or about 32% to about 33%, based on total weight of the composition. The water content of the disclosed compositions may be about 20%, about 25%, about 30%, about 31%, about 32%, about 32.5%, about 33%, about 34%, about 35%, about 40%, about 45%, or about 50%, based on total weight of the composition. In certain embodiments, the water content of the disclosed compositions is about 32.5%, based on total weight of the composition.

e. Salt

The disclosed compositions may include at least one salt. Suitable salts include, but are not limited to, inorganic salts and organic salts. Exemplary salts include inorganic or organic sulfates, phosphates, chlorides, fluorides, citrates, acetates, tartrates, hydrogen phosphates or a mixture thereof. Exemplary inorganic salts include ammonium sulfate, sodium sulfate, magnesium sulfate, aluminum sulfate, ammonium hydrogen phosphate, sodium hydrogen phosphate, potassium hydrogen phosphate, sodium chloride and ammonium chloride, or combinations thereof.

The salt content of the disclosed compositions may range from about 1% to about 10%, about 1% to about 5%, about 1.5% to about 5%, about 1.5% to about 4.5%, about 2% to about 4%, or about 2% to about 3%, based on total weight of the composition. The salt content of the disclosed compositions be about 1%, about 1.5%, about 2%, about 2.5%, about 2.6%, about 2.7%, about 2.8%, about 2.9%, about 3%, about 3.1%, about 3.2%, about 3.3%, about 4%, about 5%, about 6%, about 7%, about 8%, about 9%, or about 10%, based on total weight of the composition. In certain embodiments, the salt content of the disclosed compositions is about 2.8%, based on total weight of the composition.

f. Free Radical Initiator

The disclosed compositions may include at least one oil-soluble free radical initiator. The polymerization reaction is initiated by any method that results in generation of a suitable free radical. Initiation may be induced through the use of any number of conventional systems including thermal, photochemical, or redox coupled initiation systems. Included are thermally derived radicals, in which the radical species results from thermal, homolytic dissociation of an oil-soluble azo, peroxide, hydroperoxide or perester compound. Exemplary initiators include 2,2'-azobis(2-amidinopropane)dihydrochloride, 2,2'-azobis(N,N'dimethyleneisobutylamine) hydrochloride, 2,2'-azobis (2,4-dimethyl valeronitrile) or azobisisobutyronitrile.

The free radical initiator content of the disclosed compositions may range from about 0.01% to about 1%, about 0.02% to about 1%, about 0.02% to about 0.1%, or about 0.02% to about 0.05%, based on total weight of the composition. The free radical initiator content of the disclosed compositions may be about 0.01%, about 0.02%, about 0.03%, about 0.04%, about 0.05%, about 0.1%, about 0.5%, or about 1%. In certain embodiments, the free radical initiator content of the disclosed compositions is about 0.03%, based on total weight of the composition.

g. Chelant

The disclosed compositions may include at least one chelant. The chelant may ensure a stable product (emulsion) by isolating multivalent ions during emulsion preparation. Suitable chelants include, but are not limited to carbonates, phosphates, pyrophosphates, orthophosphates, citric acid, triethyl citrate, giuconic acid, giucoheptanoic acid, ethylenediaminetetraacetic acid (EDTA), nitrilotriacetic acid (NTA) and combinations thereof. Salts of certain chelating agents may also be suitable. For example, the sodium salt of EDTA, the sodium salt of NTA, and the sodium salt of citric acid may be suitable chelating agents. Examples of suitable phosphates include sodium phosphates. Examples of suitable carbonates include sodium carbonate and potassium carbonate.

The chelant content of the disclosed compositions may range from about 0.01% to about 1%, about 0.02% to about 1%, about 0.02% to about 0.1%, or about 0.02% to about 0.07%, based on total weight of the composition. The chelant content of the disclosed compositions may be about 0.01%, about 0.02%, about 0.03%, about 0.04%, about 0.05%, about 0.1%, about 0.5%, or about 1%. In certain embodiments, the chelant content of the disclosed compositions is about 0.05%, based on total weight of the composition.

In certain embodiments, the compositions may be essentially free of a chelant. In certain embodiments, the compositions may comprise no chelant.

h. Additives

The disclosed compositions may include one or more additional agents. Suitable additives include, but are not limited to corrosion inhibitors, scale inhibitors, friction reducers, biocides, clay swelling inhibitors, hydrogen sulfide scavengers, oxygen scavengers, surfactants, proppants, gravel, fluid loss control additives, emulsion breakers, a plasticizing additive or any combination thereof. In fracturing embodiments, proppant may be included in the treatment fluids to prevent the fracture from completely closing when the hydraulic pressure is released.

3. Synthetic Methods

The disclosed compositions may be prepared by synthetic processes typically known by those skilled in the art. In certain embodiments, the aliphatic oil and surfactant are pre-mixed until homogeneous followed by addition of aqueous components which have also been separately pre-mixed prior to addition to the oil solution. Oxygen is then excluded via inert gas purging or vacuum or both and followed by added heat with stirring to effect radical formation and subsequent polymerization. Typical preferred reaction temperature ranges are from 45° C. to about 50° C. over a time necessary for significant conversion followed by additional heat (60° C. to 65° C. approx.) to more fully convert remaining monomer as well as a final dose of free radical source to substantially complete conversion to polymer. Reaction temperature ranges can be optimized with thermally-activated free radical initiators.

4. Properties of the Compositions

The disclosed compositions can have a combination of desired properties. The compositions can reduce-friction in an aqueous fluid resulting from turbulent flow in an aqueous fluid. The compositions can also exhibit high salt tolerance.

a. Friction Reduction

The disclosed compositions provide friction reduction at low concentrations (approximately 1.0 gallons per thousand gallons fluid) in high-salt brines (e.g., >200,000 ppm salt) under shear (relative to sheared brine water only).

A measured pressure drop of the water traveling at a velocity V through a pipe of length L and diameter d after the addition of the friction reducing polymer may be compared to the calculated pressure drop for the water without the friction reducing polymer to determine a % Friction Reduction ("% FR"). In general, a % FR of greater than 50% may be achieved with the addition of an effective amount of the disclosed compositions to the selected aqueous fluid.

The disclosed compositions can provide for a friction reduction (% FR) in an aqueous fluid (e.g., a fluid having a high salt content) of 50% or greater, 55% or greater, 60% or greater, 65% or greater, 70% or greater, 75% or greater, or 80% or greater, 85% or greater, 90% or greater, or 95% or greater. The disclosed compositions can provide for a friction reduction in an aqueous fluid of about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100%.

b. Salt Tolerance

The disclosed compositions can be used for friction reduction in saline conditions (e.g., sea water, brine, or the like). The disclosed compositions can be used, for example, to reduce friction in sodium, potassium, calcium, magnesium, barium, strontium, chloride, sulfate ions or any combination thereof. The disclosed compositions can be used for friction reduction in aqueous fluids having a total dissolved solids of 100,000 mg/L or greater, 125,000 mg/L or greater, 150,000 mg/L or greater, 175,000 mg/L or greater, 200,000 mg/L or greater, 225,000 mg/L or greater, or 250,000 mg/L or greater.

5. Methods of Use

The disclosed compositions may be used in subterranean treatments where friction reduction is desired along with cation solution stability. Such subterranean treatments may include, but are not limited to, drilling operations, stimulation treatments (e.g., fracturing treatments, acidizing treatments, fracture acidizing treatments) and completion operations. In the fracturing embodiments, the compositions may be introduced into a subterranean formation at or above a rate sufficient to create or enhance at least one fracture in the subterranean formation. The disclosed compositions and methods may be especially useful in high-rate water or slick water fracturing treatments.

A method reducing friction in an aqueous fluid can include treating the aqueous fluid with an effective amount of a composition of the present disclosure. A method of reducing friction resulting from turbulent flow in an aqueous fracturing fluid in an oil field process can include treating the aqueous fracturing fluid with an effective amount of a composition of the present disclosure. The effective amount of the composition can vary based on the intended use of the aqueous fluid and the makeup of the aqueous fluid (e.g., salt content). In certain embodiments, an effective amount of the disclosed composition may be 0.5 gallons of composition per thousand gallons of aqueous fluid or less, 1.0 gallons of composition per thousand gallons of aqueous fluid or less, 1.5 gallons of composition per thousand gallons of aqueous fluid or less, or 2.0 gallons of composition per thousand gallons of aqueous fluid or less. In certain embodiments, an effective amount of the disclosed compositions (e.g., 0.5, 1.0, 1.5, or 2.0 gpt) can be used to accommodate a flow rate of aqueous fluid of 5 gallons per minute or greater, 10 gallons per minute or greater, 15 gallons per minute or greater, 20 gallons per minute or greater, 25 gallons per minute or greater, or 30 gallons per minute or greater.

6. Examples

The foregoing may be better understood by reference to the following examples, which are presented for purposes of illustration and are not intended to limit the scope of the invention.

EXAMPLE 1

Terpolymer Compositions

Exemplary terpolymer compositions can be synthesized as an oil-continuous emulsion wherein one of the three monomers in the terpolymer contains a pendant alcohol moiety. One of the other two monomers can contain a cationic functionality and the third monomer can be non-ionic. The compositions can include about 35% by weight of the terpolymer in the emulsion, about 4% by weight of a single surfactant, preferably with an HLB of about 3.7, and about 25%-65% by weight of one or more solvents. Tables 1 and 2 show exemplary terpolymer compositions prepared according to the present disclosure.

TABLE 1

Terpolymer Composition

| | Description | Raw Material | (1C) 100 g |
|---|---|---|---|
| 1 | Water | Water | 32.89 |
| 2 | Monomer | Acrylamide | 14.55 |
| 3 | Monomer | [2-(Methacryloyloxy)ethyl]tri-methylammonium chloride (DMAEM MeCl Quat 75% aqueous) | 20.50 |
| 4 | Monomer | 2-Hydroxyethylmethacrylate | 0.11 |
| 5 | Chelant | EDTA Na$_4$ | 0.05 |
| 6 | Salt | NaCl | 2.80 |
| 7 | Aliphatic oil | Escaid ® Pathfrac | 25.57 |
| 8 | Soap/Surfactant | Span 83 (Sorbitan sesquioleate) | 3.50 |
| 9 | Initiator | AIBN (Azo-bis isobutyronitrile) | 0.03 |
| | | Total | 100.00 |

The terpolymer composition of Table 1 can be prepared according to the following steps: (1) aliphatic oil and surfactant (e.g. soap) is added to a flask (FIG. 1) and stirred until the mixture becomes homogeneous, and the mixture is stirred throughout the remaining steps; (2) the water, the cationic monomer (e.g., DMAEM MeCl quat), the monomer with a pendant alcohol moiety (e.g., 2-hydroxyethylmethacrylate), the nonionic monomer (e.g., acrylamide), EDTA, and the salt (e.g., NaCl) is added to a separate stirring vessel and is stirred until a homogenous aqueous solution is formed; (3) the aqueous solution is transferred to the flask that contains the aliphatic oil and surfactant; (4) the initiator (e.g. AIBN) is added to the flask via a slurry in the aliphatic oil; (5) the vessel is purged via a nitrogen stream to degas and the flask contents are heated to 25° C. (or two degrees above ambient temperature), and the contents are continually stirred approximately 20 minutes with the temperature monitored (e.g., every 2 minutes); (6) the remainder of the procedure is switched from nitrogen purge to a nitrogen blanket; (7) the temperature is increased to approximately 45° C. for approximately 2 hours then to approximately 65° C. for approximately one hour; and (8) the heat is turned off, the contents are continually stirred and the product is transferred from the vessel at a temperature of about 30° C. or below.

TABLE 2

Terpolymer Compositions

| | Description | Raw Material | (1) 100 g | (2) 100 g | (3) 100 g |
|---|---|---|---|---|---|
| 1 | Water | Water | 37.38 | 37.87 | 37.27 |
| 2 | Monomer | Acrylamide | 14.43 | 14.39 | 13.91 |
| 3 | Monomer | [2-(Methacryloyloxy)ethyl]trimethyl ammonium chloride (DMAEM MeCl Quat 75% aqueous) | 15.27 | 15.22 | 15.90 |
| 4 | Monomer | 2-Hydroxyethylmethacrylate | 0.45 | 0.05 | 0.45 |
| 5 | Monomer | Ethylene glycol dimethacrylate | 0.01 | 0.01 | 0.01 |
| 6 | Monomer | Diethylene glycol methacrylate | 0.05 | 0.05 | 0.05 |
| 7 | Chelant | EDTA Na$_4$ | 0.05 | 0.05 | 0.05 |
| 8 | Salt | NaCl | 2.80 | 2.80 | 2.80 |
| 9 | Aliphatic Oil | Isoparaffin | 25.57 | 25.57 | 25.57 |
| 10 | Soap/Surfactant | Span 83 (Sorbitan sesquioleate) | 3.5 | 3.5 | 3.5 |
| 11 | Initiator | AIBN (Azo-bis isobutyronitrile) | 0.03 | 0.03 | 0.03 |
| 12 | Monomer Reactant | 30% sodium bisulfite | 0.01 | 0.01 | 0.01 |
| 13 | Surfactant | Methyl-9-decenoate (Elevance 1000) | 0.45 | 0.45 | 0.45 |
| | | Total | 100 | 100 | 100 |

The terpolymer compositions of Table 2 can be prepared according to the following steps: (1) aliphatic oil and surfactant (e.g. soap) is added to a flask (FIG. 1) and stirred until the mixture becomes homogeneous, and the mixture is stirred throughout the remaining steps; (2) the water, the cationic monomer (e.g., DMAEM MeCl quat), the monomer with a pendant alcohol moiety (e.g., 2-hydroxyethylmethacrylate), the nonionic monomer (e.g., acrylamide), the monomer Ethylene glycol dimethacrylate, the monomer Diethylene glycol methacrylate, EDTA, and the salt (e.g., NaCl)) is added to a separate stirring vessel and is stirred until a homogenous aqueous solution is formed; (3) the aqueous solution is transferred to the flask that contains the aliphatic oil and surfactant; (4) the initiator (e.g. AIBN) is added to the flask via a slurry in the aliphatic oil; (5) the vessel is purged via a nitrogen stream to degas and the flask contents are heated to 25° C. (or two degrees above ambient temperature), and the contents are continually stirred approximately 20 minutes with the temperature monitored (e.g., every 2 minutes); (6) the remainder of the procedure is switched from nitrogen purge to a nitrogen blanket; (7) the temperature is increased to approximately 45° C. for approximately 2 hours then to approximately 65° C. for approximately 1 hour; and (8) the heat is turn off, the contents are continually stirred until the vessel is cooled to a temperature of between 35° C. and 40° C.; (9) the temperature is maintained at 35° C. and 40° C. and 30% sodium bisulfite is added and stirred for 30 minutes; (10) Elevance is added and is continually stirred over 15 minutes and the product is transferred from the vessel at a temperature of about 30° C. or below.

EXAMPLE 2

Friction Reduction Performance

Compositions of the present disclosure were evaluated for friction reduction performance in different water systems having a high salt content.

Equipment and Procedures: The measurement system includes a 57 foot loop of one-half inch 316 stainless steel tubing (inner diameter=0.43 inch), a Moyno-type pump, a mixing/addition vessel, a liquid flow meter, and two pressure transducers. The system is filled with 9 gallons of the Base Water and a flow rate of 10 gallons per minute (gpm) is established and maintained. The baseline differential pressure (dP) is measured versus the flow rate. At two minutes elapsed time, the friction reducing composition is injected. The rate is maintained at 10 gpm for 15 minutes; the rate is increased to 15 gpm for 10 minutes; the rate is increased to 20 gpm for 5 minutes; and the rate is decreased to 10 gpm for 5 minutes before clean up.

Table 3 shows the water mediums tested. Table 4 shows the composition from Table 1 evaluated in the friction reduction experiment. Table 5 shows the compositions from Table 2 evaluated in the friction reduction experiment.

TABLE 3

Base Water

| | Barium Rich Water |
|---|---|
| Sodium | 56,100 mg/L |
| Potassium | 2,550 mg/L |
| Calcium | 18,500 mg/L |
| Magnesium | 1,720 mg/L |
| Barium | 182 mg/L |
| Strontium | 1,900 mg/L |
| Chloride | 140,300 mg/L |
| Total Dissolved Solids (TDS) | 221,300 mg/L |

TABLE 4

Friction Reduction Results (Sample 1C from Table 1)

| Test | FR Name Lot | Conc. gpt gpt | Initial Fric Red % | FR at end of 10 gpm % | FR at start of 15 gpm % | FR at end of 15 gpm % | FR at start of 20 gpm % | FR at end of 20 gpm % | FR back at 10 gpm % |
|---|---|---|---|---|---|---|---|---|---|
| 1 | 1C | 1.5 | 64 | 65 | 68 | 66 | 69 | 67 | 54 |

TABLE 5

Friction Reduction results (Samples 1-3 Table 2)

| Sample | Conc. gpt gpt | Initial Frict Red % | FR at end of 10 gpm % | FR at start of 15 gpm % | FR at end of 15 gpm % | FR at start of 20 gpm % | FR at end of 20 gpm % | FR back at 10 gpm % |
|---|---|---|---|---|---|---|---|---|
| 1 | 1.5 | 65 | 65 | 68 | 69 | 71 | 70 | 60 |
| 2 | 1.5 | 66 | 65 | 68 | 68 | 71 | 71 | 62 |
| 3 | 1.5 | 67 | 66 | 69 | 69 | 71 | 70 | 61 |

7. Exemplary Embodiments

For reasons of completeness, various aspects of the disclosure are set out in the following numbered clauses:

The results of Table 4 is depicted in FIG. 2. In FIG. 2, the "Friction Reduction" line measures percent friction reduction observed as a function of the pressure drop difference measured at the pipe wall between salty water and the friction-reducer-containing salty water solution. The water gets slicker, and flows more easily due to the presence of the friction reducer. How well the friction reducer performs relative to flowing salty water alone determines the overall friction reducer quality.

Salty water is flowed through the pipe loop for 2 minutes at a pump rate of 10 gallons per minute (gpm), followed by injection of the friction reducer at a dosage of 1.5 gallons friction reducer per 1,000 gallons (gpt). Upon adding the friction reducer, the "Friction Reduction" line turns nearly vertical followed by a perpendicular plateau region, and all of which occurs within about a 30 seconds timeframe. This 30 seconds or so timeframe is described as the "quick friction reducer hydration rate", or in other words, the friction reducer is dissolving quickly in the water and is stable, and depicts minimal friction reducer shear degradation from 2.3 minutes through about 17 cumulative minutes.

Next, the pump rate is increased to 15 gpm and continued for the next 10 minutes, and done for the purpose of determining general friction reducer shear rate stability. Subsequently, the rate is further increased to 20 gpm for about 7 minutes with similar horizontal plateau. Finally, the rate is dropped back to 10 gpm to show friction reduction reversible shear stability.

The "Temperature" line depicts observed flow loop fluid temperature with time and which indicates a slow heat buildup from shear, beginning at about 85° F. and increasing to about 97° F. This is considered normal friction heat buildup.

The "dP Pipe" line depicts the measured relative pressure difference between flowing salty water and friction-reducer-containing salty water. The "Rate (gpm)" line indicates the flow rate over time collected from a pipe flow meter.

Clause 1. A friction reducing terpolymer, comprising a cationic monomer, a nonionic monomer, and a monomer having a pendant alcohol moiety.

Clause 2. The terpolymer of clause 1, comprising, by weight, about 50 wt % to about 65 wt % the cationic monomer, about 35 wt % to about 45 wt % the nonionic monomer, and about 0.1 wt % to about 5 wt % of the monomer having a pendant alcohol moiety.

Clause 3. The terpolymer of clause 1 or clause 2, wherein the cationic monomer is N,N-dimethylaminoethyl methacrylate methyl chloride quaternary salt.

Clause 4. The terpolymer of any one of clauses 1-3, wherein the nonionic monomer is acrylamide.

Clause 5. The terpolymer of any one of clauses 1-4, wherein the monomer having a pendant alcohol moiety is 2-hydroxyethylmethacrylate.

Clause 6. The terpolymer of any one of clauses 1-4, wherein the monomer having a pendant alcohol moiety is 2-hydroxyethylmethacrylate with or without the presence of its dimethyacrylic analogue.

Clause 7. The terpolymer of any one of clauses 1-6, comprising, by weight, 56 wt % to 60 wt % N,N-dimethylaminoethyl methacrylate methyl chloride quaternary salt, 39 wt % to 43 wt % acrylamide, and 0.5 wt % to 2.5 wt % 2-hydroxyethylmethacrylate.

Clause 8. The terpolymer of any one of clauses 1-7, wherein the terpolymer is an oil-continuous emulsion.

Clause 9. A friction reducing composition, comprising, by weight, about 30 wt % to about 40 wt % of a terpolymer according to any one of clauses 1-7; about 30 wt % to about 40 wt % water; about 20 wt % to about 30 wt % of an aliphatic oil; and about 2 wt % to about 5 wt % of a surfactant.

Clause 10. The composition of clause 9, further comprising, by weight, about 1.5 wt % to about 4.5 wt % of a salt; about 0.01 wt % to about 0.1 wt % of a chelant; and about 0.01 wt % to about 0.1 wt % of a free radical initiator.

Clause 11. The composition of clause 10, wherein the salt is sodium chloride, the chelant is ethylene diamine tetraacetic acid tetrasodium (EDTA Na$_4$), and the free radical initiator is azobisisobutyronitrile.

Clause 12. The composition of clause 10, wherein the salt is sodium chloride, the chelant is ethylene diamine tetraacetic acid tetrasodium (EDTA Na$_4$), and the free radical initiator is another oil-soluble azo initiator.

Clause 13. The composition of any one of clauses 9-12, wherein the surfactant has a hydrophilic-lipophilic balance value of about 2 to about 5.

Clause 14. The composition of any one of clauses 9-12, wherein the surfactant has a hydrophilic-lipophilic balance value of about 3 to about 4.

Clause 15. The composition of any one of clauses 9-12, wherein the surfactant has a hydrophilic-lipophilic balance value of about 3.7.

Clause 16. The composition of any one of clauses 9-15, wherein the surfactant is sorbitan sesquioleate.

Clause 17. The composition of any one of clauses 9-16, wherein the aliphatic oil is a low viscosity fluid with a kinematic viscosity of about 1.7 centistokes at 40° C.

Clause 18. The composition of any one of clauses 9-17, comprising, by weight, about 32.5 wt % water, about 35.5 wt % the terpolymer, about 25.6 wt % the aliphatic oil, and about 3.5 wt % of surfactant.

Clause 19. The composition of any one of clauses 9-18, comprising, by weight, about 2.8% sodium chloride, about 0.05% ethylene diamine tetraacetic acid tetrasodium (EDTA Na$_4$), and about 0.03% azobisisobutyronitrile.

Clause 20. A method of synthesizing a terpolymer as an oil-continuous emulsion, the method comprising: combining an aliphatic oil and a surfactant to provide a first mixture; adding a cationic monomer, a nonionic monomer, a monomer having a pendant alcohol moiety, and a salt to the combined aliphatic oil and surfactant to provide a second mixture; adding a free radical initiator in an aliphatic hydrocarbon slurry to the second mixture to provide a reactant mixture; and heating the reactant mixture to provide a terpolymer as an oil-continuous emulsion.

Clause 21. The method of claim 20, wherein the terpolymer is the terpolymer of any one of clauses 1-8.

Clause 22. A method of reducing friction resulting from turbulent flow in an aqueous fracturing fluid in a subterranean fracturing process, the method comprising adding to the aqueous fracturing fluid an effective friction-reducing amount of a terpolymer.

Clause 23. The method of clause 22, wherein the terpolymer is the terpolymer of any one of clauses 1-8.

Clause 24. A method of reducing friction resulting from turbulent flow in an aqueous fracturing fluid in a subterranean fracturing process, the method comprising adding a friction-reducing composition to the aqueous fracturing fluid; wherein the friction-reducing composition comprises, by weight, about 30% to about 40% water, about 30% to about 40% a terpolymer, about 20% to about 30% an aliphatic oil, and about 2% to about 5% a surfactant.

Clause 25. The method of clause 24, wherein the friction-reducing composition is the friction-reducing composition of any one of clauses 9-19.

Clause 26. The method of any one of clauses 20-25, wherein the subterranean fracturing process is achieved in an oil field.

Clause 27. The method of any one of clauses 20-26, wherein the aqueous fracturing fluid has a high salt content.

Clause 28. The method of any one of clauses 20-27, wherein the aqueous fracturing fluid is barium rich water, sulfate rich water, or a combination thereof.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of synthesizing a terpolymer as an oil-continuous emulsion, the method comprising:
   combining an aliphatic oil and a surfactant to provide a first mixture;
   adding a cationic monomer, a nonionic monomer, a monomer having a pendant alcohol moiety, and a salt to the combined aliphatic oil and surfactant to provide a second mixture;
   adding a free radical initiator in an aliphatic hydrocarbon slurry to the second mixture to provide a reactant mixture;
   heating the reactant mixture to provide a terpolymer as an oil-continuous emulsion; wherein the terpolymer is a friction reducing terpolymer; comprising, by weight,
   about 30 wt % to about 40 wt % of a friction reducing terpolymer, comprising a cationic monomer, a nonionic monomer, and a monomer having a pendant alcohol moiety;
   about 30 wt % to about 40 wt % water;
   about 20 wt % to about 30 wt % of an aliphatic oil; and
   about 2 wt % to about 5 wt % of a surfactant; and wherein the surfactant has a hydrophilic-lipophilic balance value of about 2 to about 5.

2. A method of reducing friction resulting from turbulent flow in an aqueous fracturing fluid in a subterranean fracturing process, the method comprising adding to the aqueous fracturing fluid an effective friction-reducing amount of a terpolymer; wherein the terpolymer is a friction reducing terpolymer; comprising, by weight,
   about 30 wt % to about 40 wt % of a friction reducing terpolymer, comprising a cationic monomer, a nonionic monomer, and a monomer having a pendant alcohol moiety;
   about 30 wt % to about 40 wt % water;
   about 20 wt % to about 30 wt % of an aliphatic oil; and
   about 2 wt % to about 5 wt % of a surfactant; and wherein the surfactant has a hydrophilic-lipophilic balance value of about 2 to about 5.

3. The method of claim 2, wherein the subterranean fracturing process is achieved in an oil field.

4. The method of claim 2, wherein the aqueous fracturing fluid has a high salt content.

5. The method of claim 2, wherein the aqueous fracturing fluid is barium rich water, sulfate rich water, or a combination thereof.

* * * * *